United States Patent
Keaney

(10) Patent No.: US 11,667,312 B1
(45) Date of Patent: Jun. 6, 2023

(54) PERSONAL WATERCRAFT TRANSPORT ASSIST DEVICE

(71) Applicant: Molly Creek, LLC, Knoxville, TN (US)

(72) Inventor: Carl J. Keaney, Knoxville, TN (US)

(73) Assignee: MOLLY CREEK LLC, Knoxville, TN (US)

( * ) Notice: Subject to any disclaimer, the term of this patent is extended or adjusted under 35 U.S.C. 154(b) by 0 days.

(21) Appl. No.: 17/552,400

(22) Filed: Dec. 16, 2021

Related U.S. Application Data

(60) Provisional application No. 63/126,037, filed on Dec. 16, 2020.

(51) Int. Cl.
| | |
|---|---|
| B62B 1/26 | (2006.01) |
| B62B 5/00 | (2006.01) |
| B62B 1/20 | (2006.01) |

(52) U.S. Cl.
CPC .............. B62B 1/26 (2013.01); B62B 1/206 (2013.01); B62B 5/0083 (2013.01); *B62B 2202/403* (2013.01)

(58) Field of Classification Search
CPC .......... B62B 1/26; B62B 1/2016; B62B 1/18; B62B 1/20; B62B 1/206; B62B 1/208; B62B 5/0083; B62B 2202/403
See application file for complete search history.

(56) References Cited

U.S. PATENT DOCUMENTS

| | | | | |
|---|---|---|---|---|
| 523,520 | A | * | 7/1894 | Goldensky ............ B62B 5/0083 280/47.26 |
| 1,109,520 | A | | 9/1914 | Flower |
| 2,464,525 | A | * | 3/1949 | Nurney ................... B62B 1/208 280/42 |
| 2,540,279 | A | | 2/1951 | Mosier |
| 2,637,050 | A | | 5/1953 | Allen |
| 2,844,383 | A | | 7/1958 | Deeter |
| 2,893,580 | A | | 7/1959 | Fischer |
| 2,904,345 | A | * | 9/1959 | Bradley ................ B65F 1/1468 280/47.23 |

(Continued)

FOREIGN PATENT DOCUMENTS

| | | | | |
|---|---|---|---|---|
| DE | 102010036127 A1 | * | 3/2011 | ............... B62B 1/12 |
| FR | 3058979 A1 | * | 5/2018 | |

(Continued)

*Primary Examiner* — Steve Clemmons
(74) *Attorney, Agent, or Firm* — Luedeka Neely Group, PC

(57) ABSTRACT

A transportation kit for a personal watercraft. The transportation kit includes a foldable single wheel subassembly configured to engage a first end of a bottom portion of the personal watercraft. The wheel assembly includes first and second u-shaped support tubes attached to an axle for the wheel; a first cable-loop attached to the first and second support tubes configured to encircle a portion of the first end of the personal watercraft; a second cable-loop attached to the first and second support tubes to encircle a portion of a mid-portion of the personal watercraft; and a tensioning device attached to the second cable-loop. A foldable handle subassembly has a third cable-loop configured to encircle a portion of a second end of the personal watercraft, a first handle tube, a second handle tube, and a handle block attached to the handle tubes having a strap flange to engage the tensioning device.

20 Claims, 21 Drawing Sheets

(56) References Cited

U.S. PATENT DOCUMENTS

| | | | |
|---|---|---|---|
| 2,978,257 A | 4/1961 | Barker | |
| 3,272,529 A * | 9/1966 | Rachman | B62B 5/0083 280/47.131 |
| 3,313,554 A | 4/1967 | Hall | |
| 3,567,241 A | 3/1971 | Foschino | |
| 3,687,476 A | 8/1972 | Abbott | |
| 4,214,774 A | 7/1980 | Kluge | |
| 4,392,665 A | 7/1983 | Miller et al. | |
| 4,422,665 A | 12/1983 | Hinnant | |
| 4,440,409 A * | 4/1984 | Margison | B62B 5/0083 280/47.32 |
| 4,538,829 A | 9/1985 | Horowitz | |
| 4,579,357 A | 4/1986 | Webster | |
| 4,641,874 A | 2/1987 | Grenzer | |
| 4,712,803 A | 12/1987 | Garcia | |
| 4,824,127 A | 4/1989 | Stamm | |
| 4,936,595 A | 6/1990 | Cunningham | |
| 5,072,959 A | 12/1991 | Marullo | |
| 5,203,580 A | 4/1993 | Cunningham | |
| 5,261,680 A | 11/1993 | Freitus et al. | |
| 5,348,327 A | 9/1994 | Gieske | |
| 5,791,279 A | 8/1998 | Hart | |
| 5,924,709 A * | 7/1999 | Yang | B62B 5/0083 280/47.131 |
| 5,941,544 A | 8/1999 | Fiedler | |
| 5,975,003 A | 11/1999 | Manson | |
| D427,407 S | 6/2000 | Witt | |
| 6,142,492 A | 11/2000 | DeLucia | |
| 6,189,900 B1 | 2/2001 | MacDonald | |
| 6,364,336 B1 | 4/2002 | Jenkins | |
| 6,416,066 B1 | 7/2002 | Ciulis | |
| 6,446,570 B1 | 9/2002 | Johnson | |
| 6,513,816 B1 * | 2/2003 | Kijima | A63B 55/60 280/DIG. 6 |
| D476,129 S | 6/2003 | Witt | |
| 7,207,576 B1 * | 4/2007 | Ibarra | B62B 5/0083 280/30 |
| 7,243,928 B2 | 7/2007 | Singer | |
| 7,296,816 B2 | 11/2007 | Wilnau | |
| 8,690,167 B1 * | 4/2014 | Huntley | B62B 5/067 280/47.331 |
| 8,955,453 B2 | 2/2015 | Angelow | |
| 9,926,056 B2 | 3/2018 | Krueger | |
| 10,633,009 B2 * | 4/2020 | Webber | B62B 5/0083 |
| D929,067 S * | 8/2021 | Kowalski | D34/24 |
| 2001/0052686 A1 | 12/2001 | Galik | B62K 27/006 280/504 |
| 2006/0017246 A1 * | 1/2006 | Singer | B62B 1/26 280/47.331 |
| 2006/0186635 A1 | 8/2006 | Stewart | |

FOREIGN PATENT DOCUMENTS

| | | | | |
|---|---|---|---|---|
| GB | 2130973 A | * | 6/1984 | B62B 5/0083 |
| GB | 2224701 A | * | 5/1990 | B62B 1/264 |
| GB | 2550914 A | * | 12/2017 | B62B 1/26 |
| SE | 1651320 A1 | * | 12/2017 | |
| SE | 542575 C2 | * | 6/2020 | B60P 3/10 |

* cited by examiner

PERSONAL WATERCRAFT TRANSPORT ASSIST DEVICE

CROSS-REFERENCE TO RELATED APPLICATION

This application claims priority to U.S. Provisional Application No. 63/126,037 filed Dec. 16, 2020, entitled PERSONAL WATERCRAFT TRANSPORT ASSIST DEVICE, incorporated herein by reference in its entirety.

TECHNICAL FIELD

The present invention relates to the transport of personal watercraft on land. In particular, the invention is a transportation kit including a wheel subassembly and a handle subassembly which attach to the personal watercraft to assist with the transport of the watercraft over land. The kit is also compactable for stowage in watercraft.

BACKGROUND

For most personal watercraft use, a boater, with all necessary gear, would arrive at the starting location for a waterborne journey in a car, truck, or other self-propelled vehicle. Although this is ideal, in many cases it is not possible because there is no vehicular access to departure site for the waterborne journey. In some cases where direct departure-point access is impossible with a vehicle, it is possible to arrive by hiking over land. Personal watercraft users may attempt to reach their launch points by carrying their boat and gear on one or both shoulders or by dragging the boat with its hull sliding on the ground. There also exist carts or wheelsets attachable to the watercraft to assist with overland travel.

There are drawbacks to all the above-described non-vehicular assisted methods of moving a small watercraft over land. A single-shoulder carry for instance is strenuous on the user's back and requires significant physical stamina. Using a specially designed backpack with padded shoulder straps lessens some of the effort of unassisted single-shoulder carry but is still extremely challenging physically, the total load being in the range of eighty pounds. Dragging the boat hull over dry land is also arduous. Depending on the surface conditions, dragging the hull may also cause significant wear to the hull, thus reducing the useful lifespan of the watercraft.

There exist wheeled carts designed to assist with the overland transport of small watercraft. Although they may greatly reduce the effort of the land journey, there are drawbacks to the existing art the present invention overcomes. Known wheeled devices for assisting with the transport of personal watercraft use two wheels and are bulky. Typically, they are designed to be left at the point of departure for the waterborne journey and used to reverse the land traverse upon return. For some ocean and lake voyages, this will work. However, for river or creek paddlers who will be travelling with the flow of the water, no return to the launch site is planned, and any assistive device used must be stowed and carried downstream.

Some of these known wheeled devices are somewhat compactible and are intended to be stowed in the personal watercraft during waterborne use. However, many craft do not have adequate stowage space for these devices. Typical personal watercraft, such as whitewater kayaks and canoes for example, have relatively limited stowage space and their performance in whitewater suffers with additional stowed weight.

In prior art devices, a wheel or wheels attached to a watercraft for the purpose of assisting with land traverse typically incorporates a single handle. The single handle has the disadvantage of not being capable of being symmetrically grasped by both hands. This asymmetry distributes the load unevenly on the person bearing the load.

What is needed, therefore, is a sturdy wheeled device capable of attaching to a personal watercraft for the purposes of aiding in transport. The device should be capable of being symmetrically grasped by both hands in order to distribute the load evenly on the person bearing the load. The device should also be lightweight and easily stowed on or within the personal watercraft.

SUMMARY

The above and other needs are met by a transportation kit. The transportation kit includes a foldable single wheel subassembly configured to engage a first end of a bottom portion of the personal watercraft, wherein the foldable wheel assembly has a first and second u-shaped support tubes attached to an axle for the foldable single wheel assembly; a first cable-loop attached to the first and second support tubes, wherein the first cable-loop is configured to encircle a portion of the first end of the personal watercraft; a second cable-loop attached to the first and second support tubes, wherein the second cable-loop is configured to encircle a portion of a mid-portion of the personal watercraft; and a tensioning device attached to the second cable-loop. The kit also includes a foldable handle subassembly having a third cable-loop configured to encircle a portion of a second end of the personal watercraft; a first handle tube having first and second ends; and a second handle tube having first and second ends, wherein the first end of each of the first and second handle tubes comprises a handle block having a strap flange disposed thereon configured to engage the tensioning device for tensioning the first cable-loop, second cable-loop and third cable-loop with respect to the personal watercraft to removably attach the transportation kit to the personal watercraft.

In some embodiments, the personal watercraft is a commercially available kayak.

In some embodiments, the first u-shaped support tube, the second u-shaped support tube, the first handle tube, and the second handle tube are made of aluminum tubing.

In some embodiments, the first cable-loop, the second cable-loop and the third cable-loop are stainless-steel wire rope coated with a durable plastic coating.

In some embodiments, the tensioning device is a commercially available polypropylene webbing strap and cam-lock.

In some embodiments, the handle block includes a motion limiting device for the first and second handle tubes.

In some embodiments, the handle block has a first groove disposed tangentially upon an outer edge of a first hole of the handle block wherein the first groove has a first end, a second end, and a first notch disposed perpendicular to the second end; a second groove disposed tangentially upon an outer edge of a second hole of the handle block wherein the second groove has a first end, a second end, and a second notch disposed perpendicular to the second end; a first pin disposed in the first groove and in a hole disposed in the first end of the first handle tube; and a second pin disposed in the second grove and in a hole disposed in the first end of the second handle tube; wherein the first pin is located within the hole disposed in the first handle tube and engages the first groove as the first handle tube is inserted into the first hole of the handle block. The second pin is located within the hole disposed in the second handle tube and engages the second groove as the second handle tube is inserted into the second hole of the handle block. As the first handle tube is rotated axially about the first hole of the handle block, the first pin travels within the first groove. As the second handle tube is rotated axially about the second hole of the handle block, the second pin travels withing the second groove. When the first handle tube reaches maximum outward rotation, the first pin engages a first notch. When the second handle tube reaches maximum outward rotation, the second pin engages a second notch. When tension is applied to the handle block via the tensioning device, the first and second pins are constrained within the first and second notches.

In some embodiments, there is provided a method of attaching a transportation kit to a personal watercraft. The method includes providing a collapsible wheel subassembly having a single wheel rotationally attached to an axle; a first u-shaped support tube; a second u-shaped support tube; at least one support device disposed between the first u-shaped support tube and the second u-shaped support tube constraining an outward radial rotation of the first u-shaped support tube and the second u-shaped support tube; a first cable-loop sized to encircle a first end of a personal watercraft attached adjacent to the second end of the first and second u-shaped support tubes; a second cable-loop sized to encircle a middle portion of the personal watercraft attached to the first and second u-shaped tubes between the first end and the second end of each of the first and second u-shaped tubes; and a tensioning device attached to the second cable-loop. The method also includes providing a collapsible handle subassembly having a first handle tube; a second handle tube; a third cable-loop sized to encircle a second end of a personal watercraft; and a handle block having a strap flange disposed to an exterior portion of the handle block, the handle block having a first hole and a second hole sized to receive the first handle tube and the second handle tube, and a motion limiting device for each of the first and second handle tubes. The wheel subassembly is arranged in relation to the personal watercraft so as to locate the middle portion of the personal watercraft within the second cable loop of the wheel assembly, the first end of the personal watercraft within the first cable loop of the wheel sub assembly, with the lower portion of the personal watercraft resting on each of the first and second u-shaped support tubes of the wheel sub assembly. The handle subassembly is arranged in relation to the personal watercraft so as to locate the second end of the personal watercraft within the third cable-loop, while positioning the handle block on a top surface of the personal watercraft. The first handle tube and the second handle tube are rotated axially to orient the first handle tube and the second handle tube at the maximum distance allowed by the motion limiting device. The wheel subassembly is connected to the strap flange to provide tension on the first cable-loop, second cable-loop, and third cable-loop. The tensioning device is tensioned so that the first cable loop, the second cable loop, and the third cable loop are brought into firm contact with the personal watercraft and assembly, allowing the personal watercraft to be transported via the wheel and controlled via the first handle tube and the second handle tube.

In some embodiments there is provided a transportation kit for a personal watercraft that includes a) a wheel subassembly having a single wheel, the wheel rotationally attached to an axle; a first wheel support, the first wheel support having a first hole for receiving a first end of the axle and a second hole disposed for receiving a first end of a first u-shaped support tube; a second wheel support, the second wheel support having a first hole for receiving a second end of the axle and a second hole disposed for receiving a first end of a second u-shaped support tube; at least one support device disposed between the first u-shaped support tube and the second u-shaped support tube, thereby constraining an outward radial rotation of the first u-shaped support tube and the second u-shaped support tube; a first cable-loop sized to encircle a first end of a personal watercraft attached adjacent to the second ends of first and second u-shaped support tubes; a second cable-loop sized to encircle a middle portion of the personal watercraft attached to the first and second u-shaped tubes between the first end and the second end of each of the first and second u-shaped tubes; and a tensioning device attached to the second cable-loop. A portion of each of the first and second u-shaped support tubes rests against a bottom surface of the personal watercraft. The transportation kit also includes b) a handle subassembly having a first handle tube, the first handle tube having a first end and a second end; second handle tube, the second handle tube having a first end and a second end; a third cable-loop sized to encircle a second end of a personal watercraft attached to the first handle tube and to the second handle tube; and a handle block having a strap flange disposed on an exterior portion of the handle block, the handle block having a first hole and a second hole sized to receive the first end of the first handle tube and the first end of the second handle tube, and a motion limiting device for each of the first and second handle tubes.

The present invention provides a single wheel temporarily mountable to the hull of a personal watercraft aligned with the bow-stern centerline of the craft and a temporarily mountable rigid handle with two prongs, one for each hand of the user, disposed symmetrically across the bow-stern centerline of the craft. The handle prongs are connected to the watercraft with such rigidity that the user can easily balance the watercraft over the single wheel while walking the device and watercraft over land. As a result of the secure attachment of the rigid handle the watercraft may either be pushed in front of the user or pulled behind the user over the terrain.

BRIEF DESCRIPTION OF THE DRAWINGS

The following drawings and photos illustrate the present invention.

DETAILED DESCRIPTION

With reference to the drawings, the disclosure relates to a kit for transporting a personal watercraft 102 consisting of a wheel subassembly 200 and a handle subassembly 300. In certain embodiments, the personal watercraft 102 is a commercially available kayak.

Figure 1:
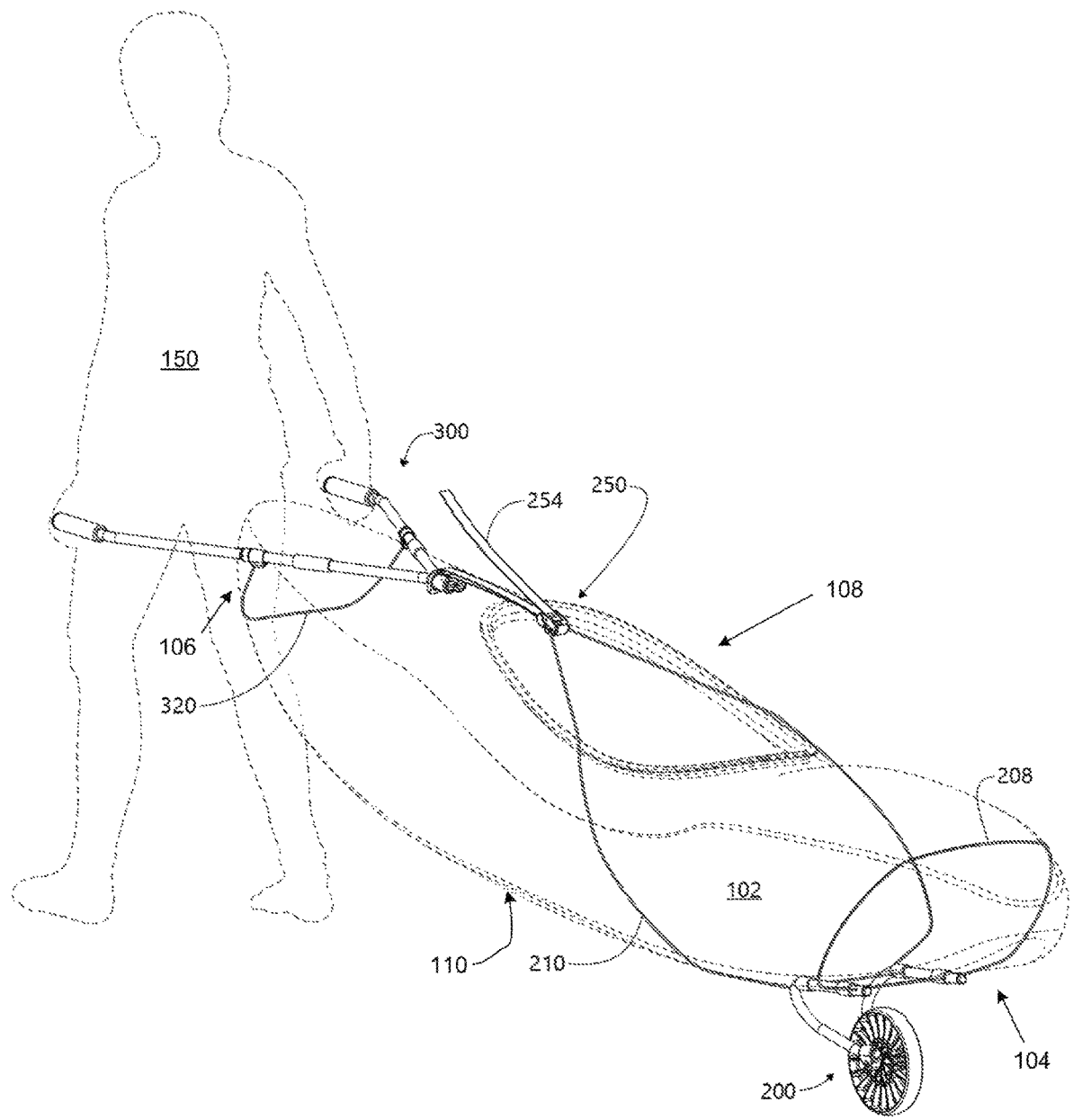
FIG. 1 is a perspective view of a watercraft transport device attached to a personal watercraft being transported by a user.

The transportation kit is particularly suitable for use for transporting monohull personal watercrafts such as whitewater kayaks and certain canoes. It will be understood the transportation kit is also suitable for carrying other personal watercraft utilizing a hull shape appropriate for operative connection with the transportation kit described herein. With reference to FIG. 1, the personal watercraft 102 includes a first end 104 and a second end 106. Disposed between the first end 104 and the second end 106 is a middle portion 108. The personal watercraft 102 typically features a hull shape with the widest portion being the middle portion 108 and tapering towards the first end 104 and the second end 106. Additionally, the personal watercraft 102 features a bottom surface 110.

Figure 2:
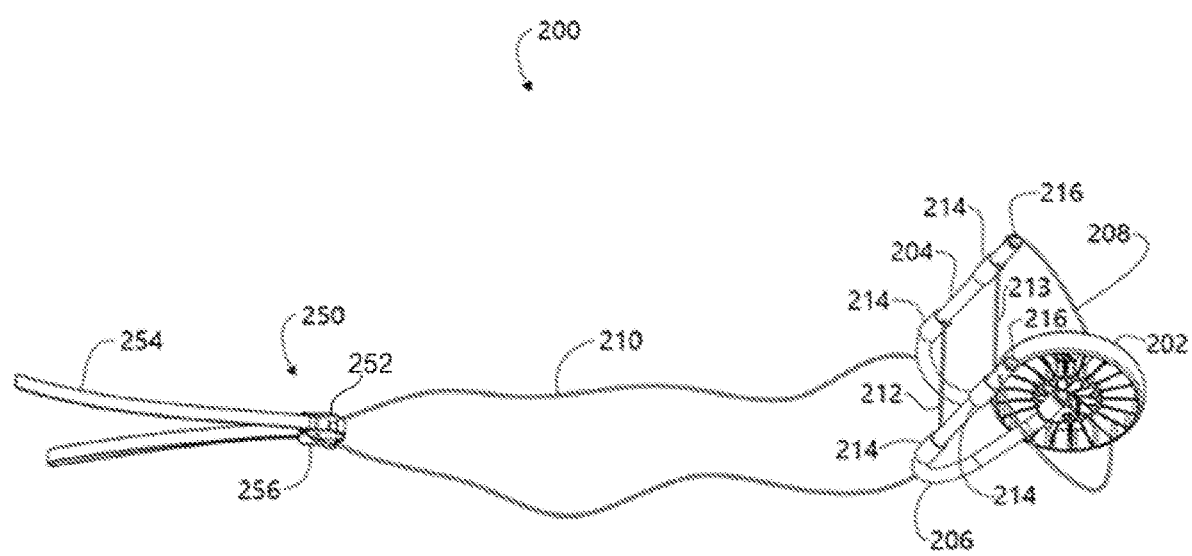
FIG. 2 is a perspective view of the wheel subassembly of the device in the open position.
Figure 3:
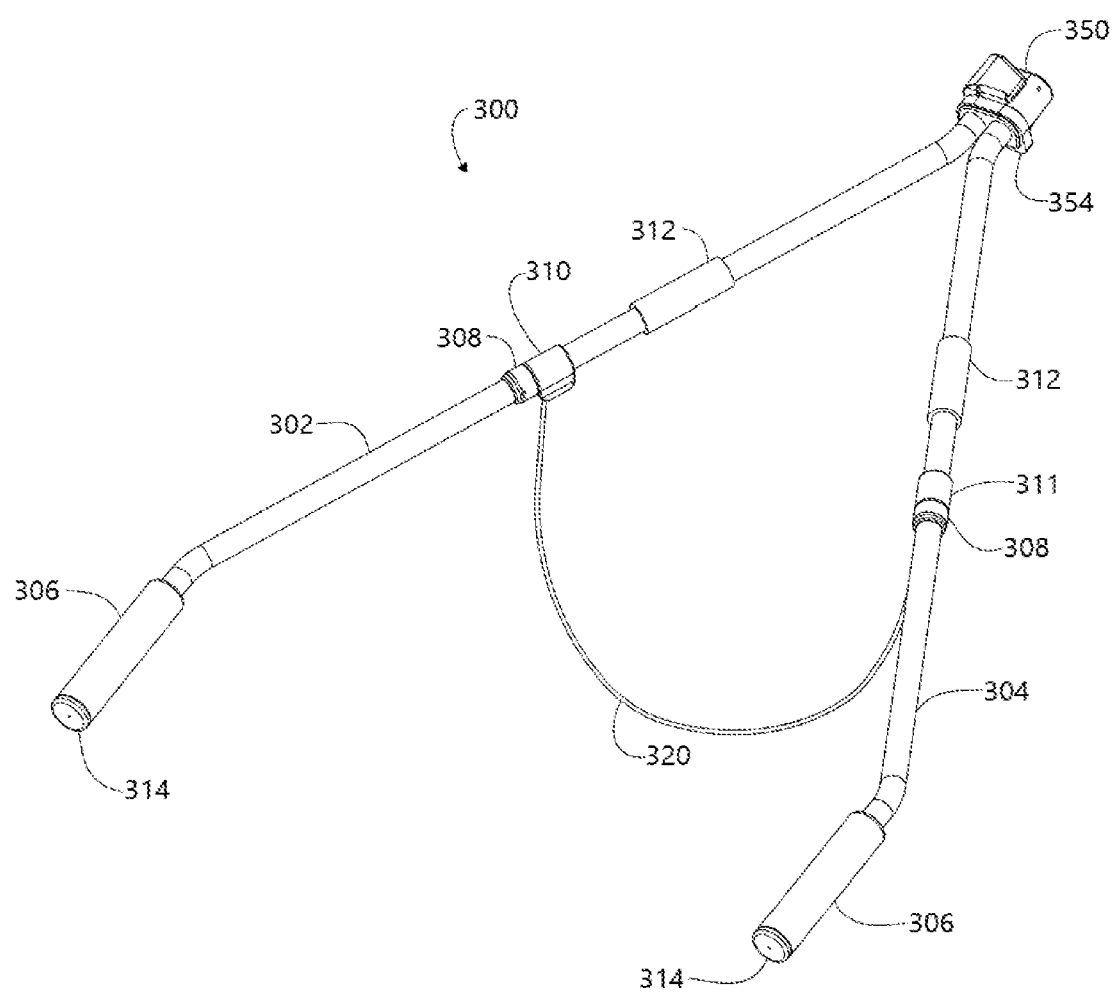
FIG. 3 is a perspective view of the handle subassembly of the device in the open position.
Figure 10:
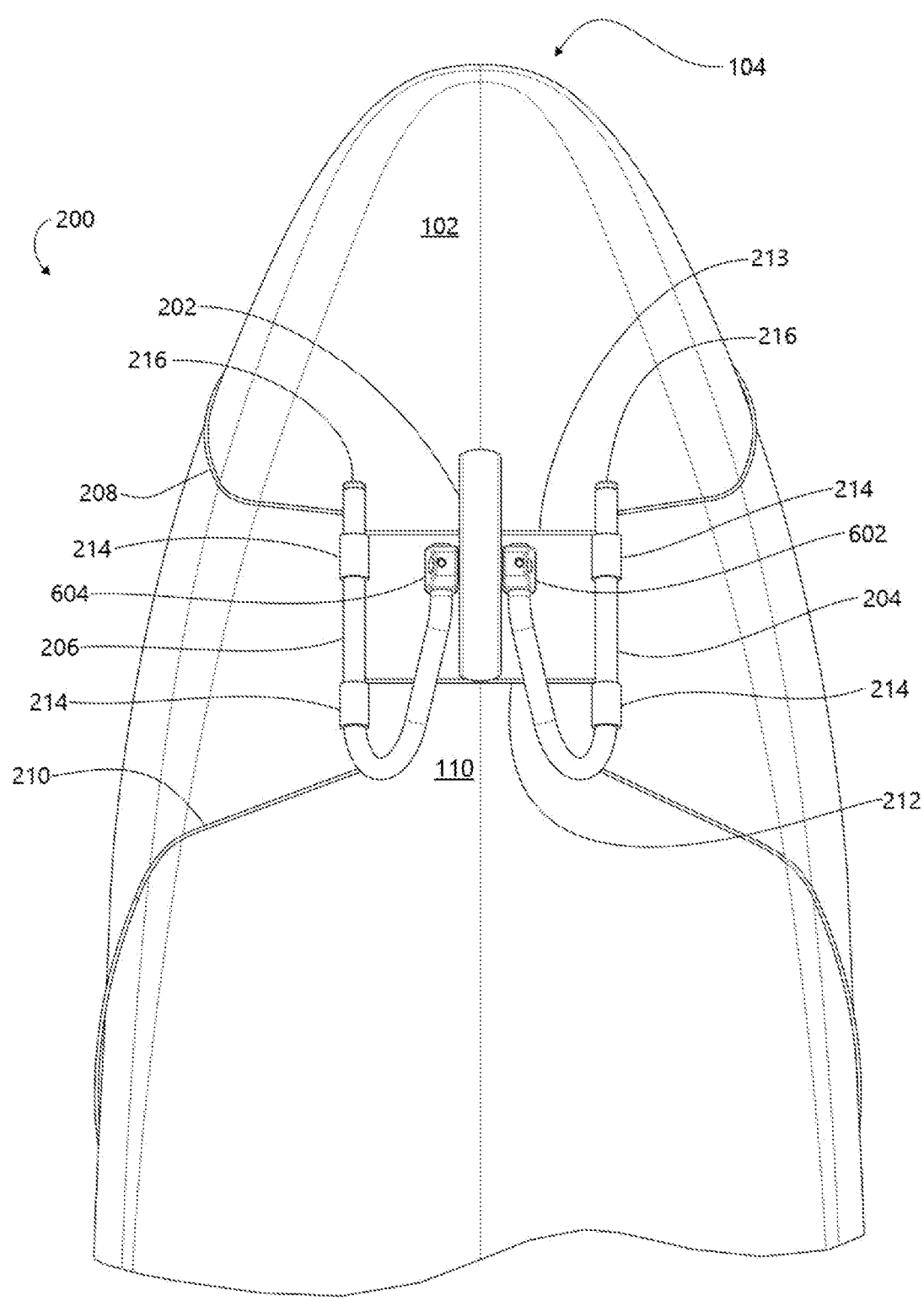
FIG. 10 is a plan view of wheel subassembly of FIG. 2 mounted to a personal watercraft viewed from the bottom side of the personal watercraft.

FIG. 2 illustrates a wheel subassembly 200 composed primarily of a single wheel 202, a first U-shaped support tube 204, a second U-shaped support tube 206, a first cable-loop 208, a second cable-loop 210, and a tensioning device 250. The first cable-loop 208 and the second cable-loop 210 have a predetermined fixed length for the watercraft 102 depending on the particular size and design of the watercraft. The tensioning device 250 includes a flexible tension strap 254 and a cam-lock device 252/256. Further, the wheel subassembly 200 includes a first wheel support 602, a Second Wheel Support 604 (FIG. 6), and at least one flexible support limit device 212 (FIG. 10). Referring again to FIG. 6, the first U-shaped support tube 204 includes a pair of end caps 216 and a pair of watercraft contact cushions 214. The first U-shaped support tube 204 also includes a pin slot 610. Similarly, the second U-shaped support tube 206 includes a pair of end caps 216, a pair of watercraft contact cushions 214, and a pin slot 612. The first U-shaped support tube 204 is placed in the first wheel support hole 606 and retained via a pin 618 inserted through the first wheel support pin hole 702 (FIG. 7) and the corresponding first U-shaped support tube pin slot 610. Similarly, the second U-shaped support tube 206 is placed in the second wheel support hole 608 and retained via a pin 620 inserted through the second wheel support pin hole 704 and the corresponding second U-shaped support tube pin slot 612.

Figure 6:
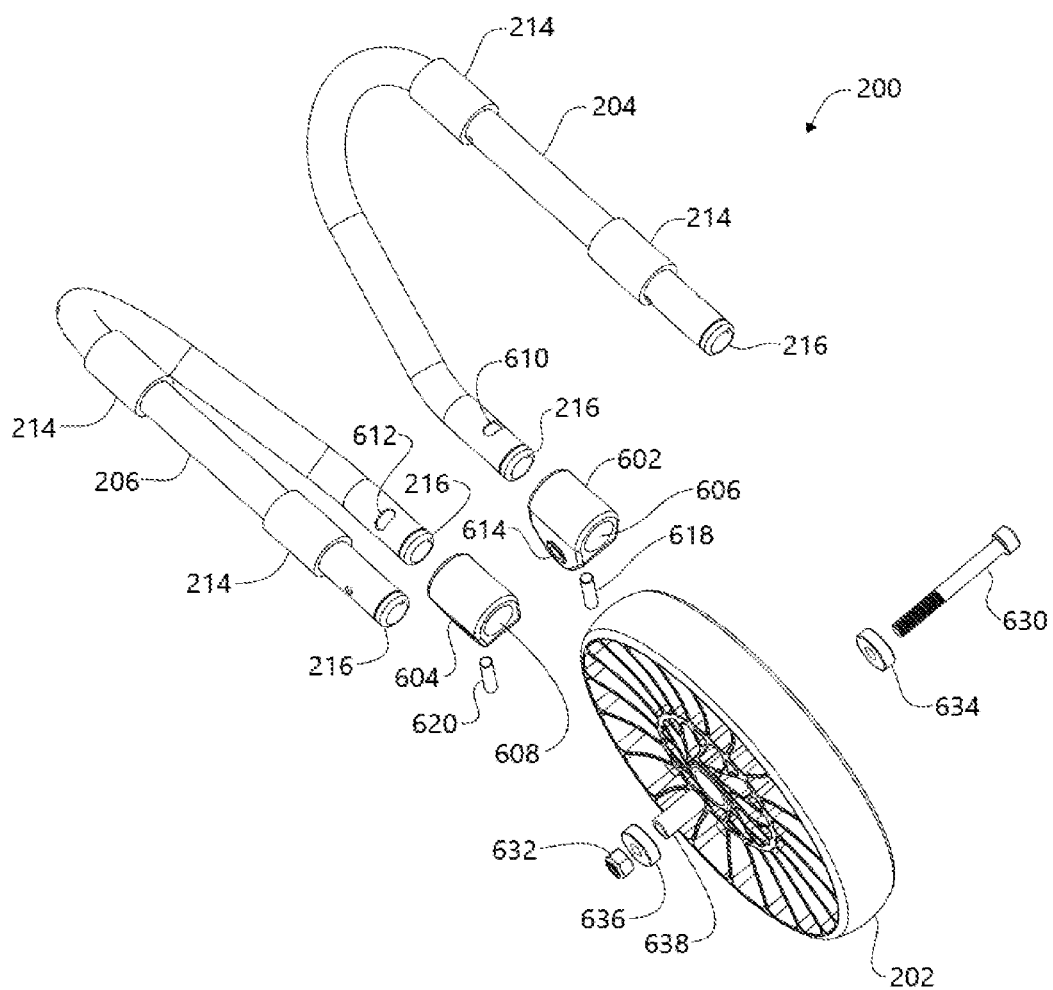
FIG. 6 is a perspective exploded view of the wheel subassembly of FIG. 2 in the open position with some components omitted for clarity.
Figure 7:
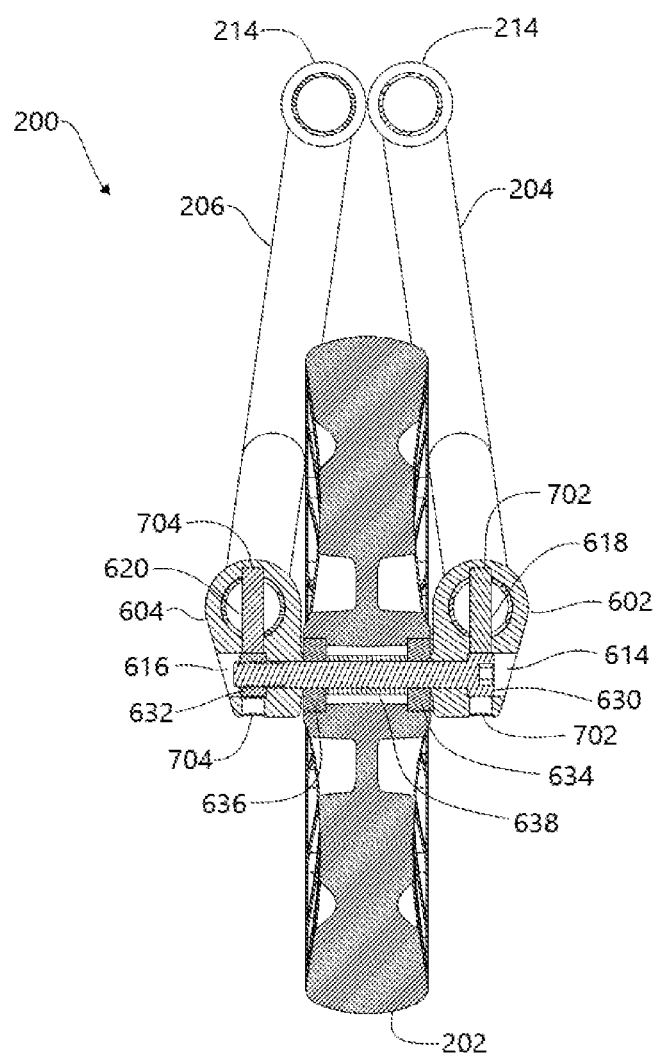
FIG. 7 is a section of the wheel subassembly of FIG. 2 through the vertical centerline of the wheel, viewed from the rear, with the support tubes in the closed position, with some components omitted for clarity.
Figure 8:
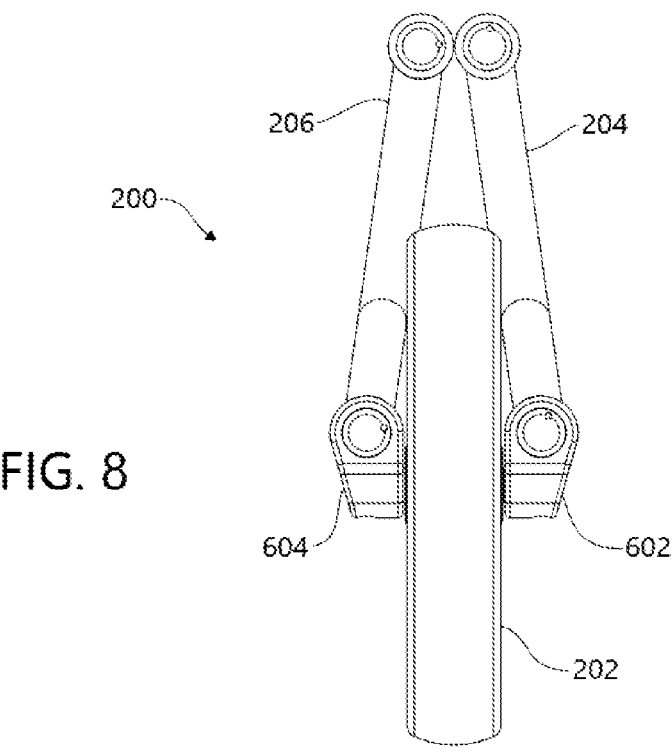
FIG. 8 depicts the wheel subassembly of FIG. 2 from the rear in the closed position with some components omitted for clarity.
Figure 9:
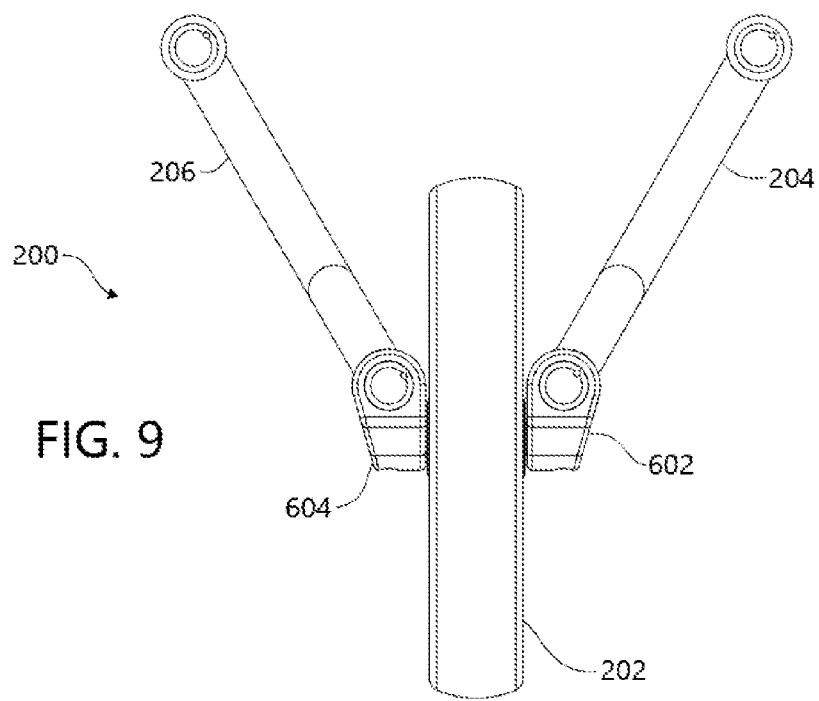
FIG. 9 depicts the wheel subassembly of FIG. 2 from the rear in the open position with some components omitted for clarity.

After the first U-shaped support 204 and the second U-shaped support tube 206 are assembled to the first wheel support 602 and the second wheel support 604, first wheel support 602 and second wheel support 604 are rotationally attached to wheel 202. Bearing 634 and bearing 636 are inserted into wheel 202 with spacer 638 located between bearing 634 and bearing 636. Referring to FIGS. 6-7, first wheel support 602 at axle hole 614 in the wheel support 602 is then aligned with the center of wheel 202. Axle bolt 630 is then inserted through the axle hole 614 in the wheel support 602, bearings 634 and 638, spacer 638, and the axle hole 616 in the wheel support 604. An axle nut 632 is then securely connected to the axle bolt 630 allowing for rotation of the wheel 202 about the axle bolt 630. The pin 618, in conjunction with the pin slot 610 are effective to guide the axial rotation path of the first U-shaped support tube 204 about the first wheel support hole 606. The pin 620, in conjunction with the pin slot 612 is effective guide the axial rotation path of the second U-shaped support tube 206 about the second wheel support hole 608. Inward rotation of the first and second U-shaped support tubes 206 and 206 to a closed position as shown in FIGS. 7 and 8 is ultimately limited by the contact between the first U-shaped support tube 204 and the second U-shaped support tube 206. Outward rotation of the first and second U-shaped support tubes 204 and 306 to an open position as shown in FIGS. 9 and 10 is limited by the pin 618 traveling in the pin slot 610, the pin 620 traveling in the pin slot 612 and the flexible support limit device 212 and/or 213.

The Wheel Subassembly 200 also includes a first cable-loop 208 and a second cable-loop 210 (FIG. 1). The first cable-loop 208 is sized to encircle the first end 104 of the personal watercraft 102. The second cable-loop 210 is sized to encircle the middle portion 108 of the personal watercraft 102. Attached to the second cable-loop 210 is the tensioning device 250. The first cable-loop 208 and the second cable-loop are comprised of a flexible, inelastic material that may be coated with a protective coating or soft coating to prevent marring of personal watercraft surface.

Figure 4:
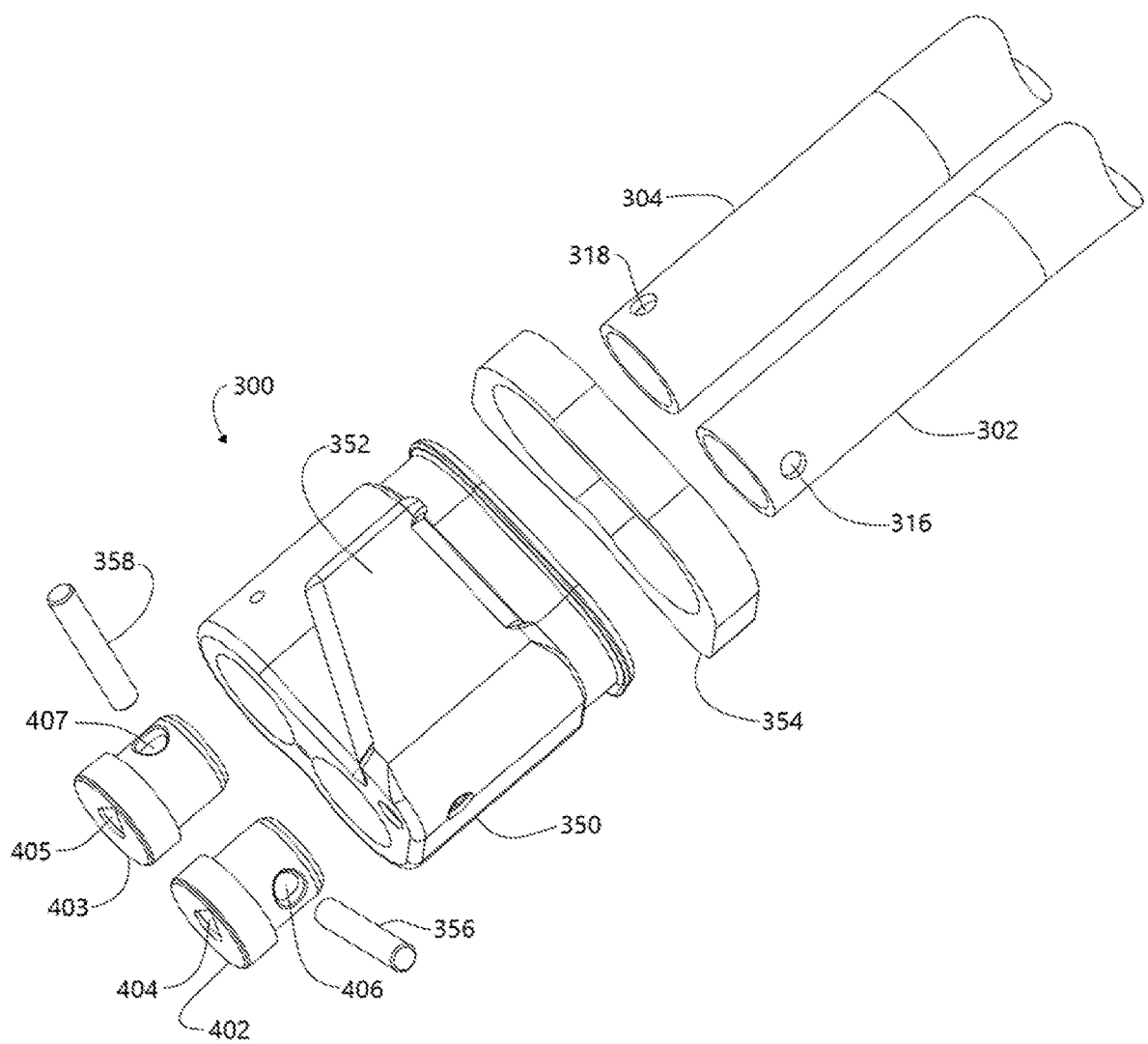
FIG. 4 is a perspective exploded view of handle block for the handle subassembly of FIG. 3.
Figure 5:
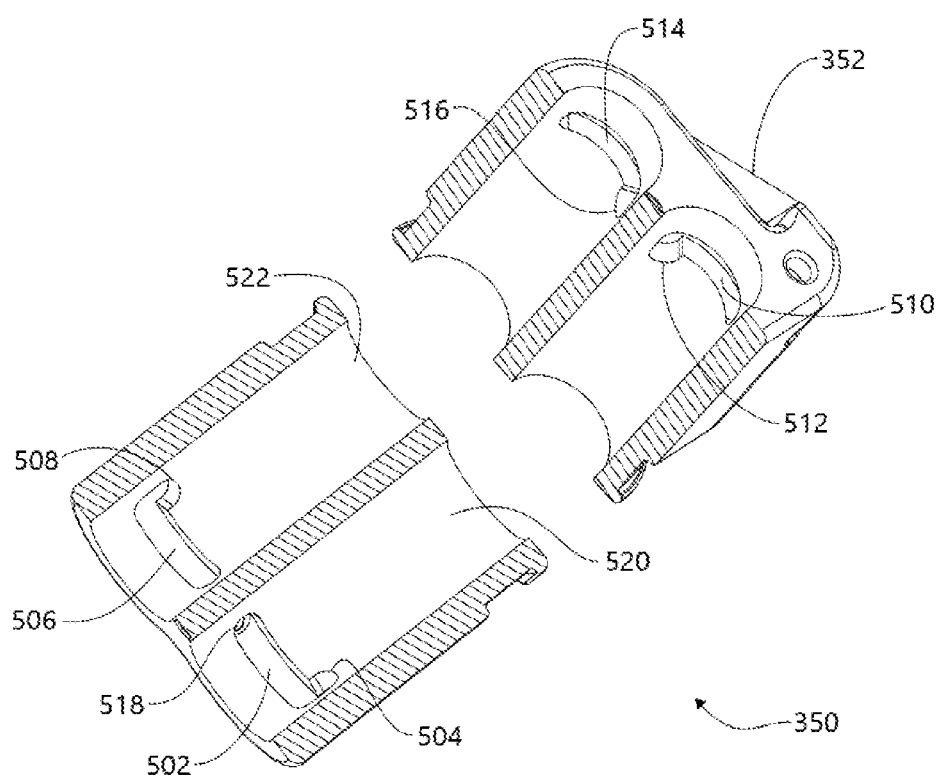
FIG. 5 is a cross-section of the handle block of FIG. 4 through the axis of the tube holes with both halves of the handle block shown as if opened like a clamshell case.

With reference now to FIGS. 3-5 and 17-21, the handle subassembly 300 and operation thereof will be described. The handle subassembly 300 is composed primarily of a first handle tube 302, a second handle tube 304, a third cable-loop 320 having a predetermined fixed size for the watercraft 102 depending on the particular size and design of the watercraft, and a handle block 350. The first handle tube 302 includes a first end sized to insert into a first hole 520 in the handle block 350 with a tight, non-interference fit. An end cap 402 is disposed in an opposite end of the first hole 520 (FIGS. 4 and 5). The first handle tube 302 also includes a second end distal from the first end that is sized to securely engage a hand grip 306 and accept an end cap 314. The second handle tube 304 includes a first end sized to insert into a second hole 522 of the handle block 350 with a tight, non-interference fit. An end Cap 403 is disposed in an opposite end of the second hole 522. The second handle tube 302 also includes a second end distal from the first end that is sized to securely engage the hand grip 306 and accept the end cap 314.

The third cable-loop 320 is attached to the first handle tube 302 by a cable-loop retainer 310. The cable-loop retainer 310 is limited in linear motion by a cable-loop stop 308 and watercraft contact cushion 312. The third cable-loop 320 is attached to the second handle tube 304 by a cable-loop retainer 311. The cable-loop retainer 311 is limited in linear motion by the cable-loop stop 308 and the watercraft contact cushion 312. The watercraft contact cushions 312 may be made of an elastomeric foam material or other resilient non-slip material that will protect an exposed surface of the watercraft 102.

Referring to FIG. 4, the handle block 350 includes a strap flange 352 dimensioned to engage the flexible tension strap 254 of the tensioning device 250. The handle block 350 also includes a watercraft contact cushion 354 to prevent damage to the surface of the personal watercraft 102 when the transportation kit is in use. Further, the handle block 350 includes a motion limiting device, depicted in FIGS. 4 and 5 as a series of pins, grooves, and notches, allowing the first handle tube 302 and the second handle tube 304 to rotate axially outward about the first hole 520 and the second hole 522 for use and rotate inward about the same axes for storage as described in more detail below.

In certain embodiments as shown in FIGS. 4-5, the motion limiting device of the handle block 350 includes primarily a first groove 502, a first Notch 504, a second groove 506, a second notch 508, the pin 356, and the pin 358. The first groove 502 is located circumferentially on an outer surface of hole 520. The first notch 504 is located at the end of the first groove 502 farthest from a centerline of the handle block 350 and is oriented orthogonal to an axial direction of hole 520. In operation, the pin 356 engages a hole 316 in the handle tube 302, an end cap hole 406, and the first groove 502. The pin 356 acts to limit the rotation of the first handle tube 302 in an open position. As the first handle tube 302 is rotated axially about first hole 520, the pin 356 travels in first groove 502. Upon reaching the maximum allowed rotation of the first handle tube 302, tension is applied by the flexible tension strap 254 which is connected to strap flange 352 of the handle block 350. The tension applied by the flexible tension strap 254 of the tensioning device 250 forces the pin 356 into the first notch 504 thereby eliminating the possibility of unwanted axial rotation of the first handle tube 302. To ensure that the pin 356 is aligned with the notch 504 before tension is applied by the tensioning device, the end cap 402 includes a rotation indicator 404.

The second groove 506 is located circumferentially on an outer surface of the hole 522. A second notch 508 is located at the end of the second groove 506 farthest from the centerline of the handle block 350 and is oriented orthogonal to an axial direction of the hole 522. In operation, the pin 358 engages a handle tube second hole 318, an end cap hole 407, and the second groove 506. The pin 358 acts to limit the rotation of second handle tube 304 in an open position. As the second handle tube 304 is rotated axially about second hole 522, the pin 358 travels in the second groove 506. Upon reaching the maximum allowed rotation of the second handle tube 304, tension is applied by the tensioning device 250 and the flexible strap 254 which is connected to strap flange 352. The tension applied by the tensioning device 250 and flexible strap forces the pin 358 into the second notch 508 thereby eliminating the possibility of unwanted axial rotation of the second handle tube 304. To ensure that the pin 358 is aligned with the notch 508 before tension is applied by the tensioning device, the end cap 403 includes a rotation indicator 405.

In certain embodiments, the motion limiting device of handle block 350 includes an additional third groove 510 and a third notch 512, located opposite the first groove 502 and the first notch 504 on the circumferential wall of the hole 520. The handle block 350 also includes a fourth groove 514 and a fourth notch 516 located opposite the second groove 506 and the second notch 508 on the circumferential wall of the hole 522. The third and fourth notches 512 and 514 are located nearest to the centerline of the handle block 350 and limit the inward rotation of the handle tubes 302 and 304. When the handle tubes 302 and 304 are rotated to be adjacent to one another, pressure on the end caps 402 and 403 will cause the pins 356 and 358 to engage the respective notches 512 and 516 to prevent unwanted rotation of the handle tubes 302 and 304 to an open or non-adjacent position.

It will be appreciated that the pins 356 and 358 are inserted the holes 316 and 318 of the first and second handle tubes 302 and 304 and through holes 406 and 407 of the end caps 402 and 403 so that the pins 356 and 358 penetrate through the first and second handle tubes 302 and 304 to operatively engage groves 502, 506, 510 and 514 in the handle block 350.

In operation, the transportation kit is used as follows: the wheel subassembly 200 is placed in an open position as shown in FIGS. 9 and 10 by rotating the first U-shaped support tube 204 and second U-shaped support tube 206 away from the centerline of the wheel 202. The first cable loop 208 is then placed around first end 104 of the watercraft 102 (FIG. 1). The second cable loop 210 is placed around the middle portion 108 of the watercraft 102 and the bottom surface 110 of the watercraft 102 is made to rest on watercraft contact cushions 214 of the wheel subassembly 200. By placing the second cable loop 210 around the middle portion 108, the tensioning device 250 is also located within the middle portion 108 of the watercraft 102. Next, the handle subassembly 300 is placed in the open position by rotating the first handle tube 302 and the second handle tube 304 away from the centerline of the handle block 350. The user 150 may apply a force on the end caps 402 and 403 to cause the pins 356 and 358 to engage with notches 504 and 508, respectively. The engagement pins 356 and 358 with notches 504 and 508 prevents rotation of the first handle tube 302 and second handle tube 304 toward each other. The user 150 then sets the handle subassembly 300 atop the personal watercraft 102 and encircles the second end 106 of the watercraft 102 with third cable-loop 320.

Figure 13:
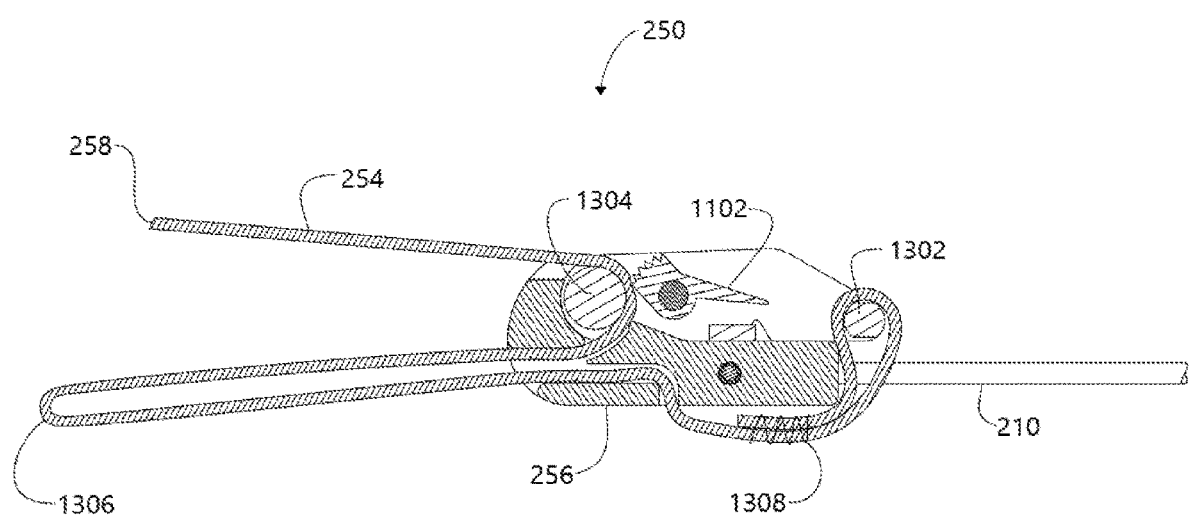
FIG. 13 is a cross-sectional view of the cam-lock component of FIG. 12.
Figure 14:
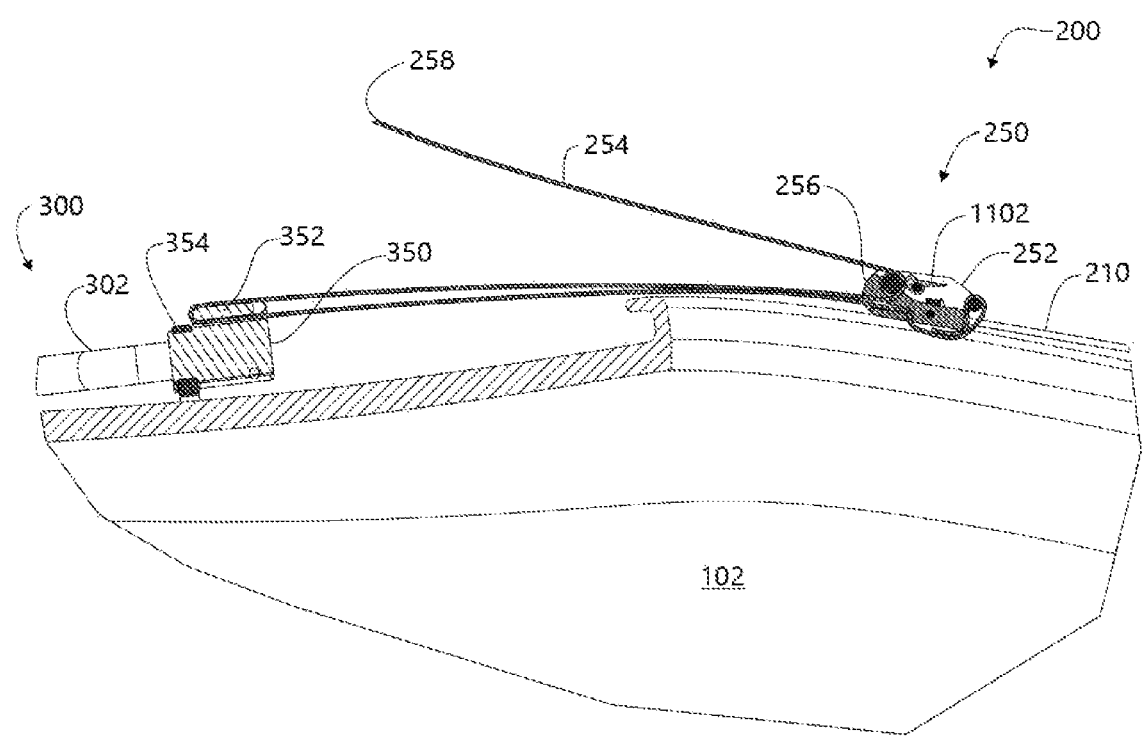
FIG. 14 is a detail view of a region of a section through the long (port to stern) centerline of the cam-lock component of FIG. 12 attached to a typical personal watercraft.
Figure 15:
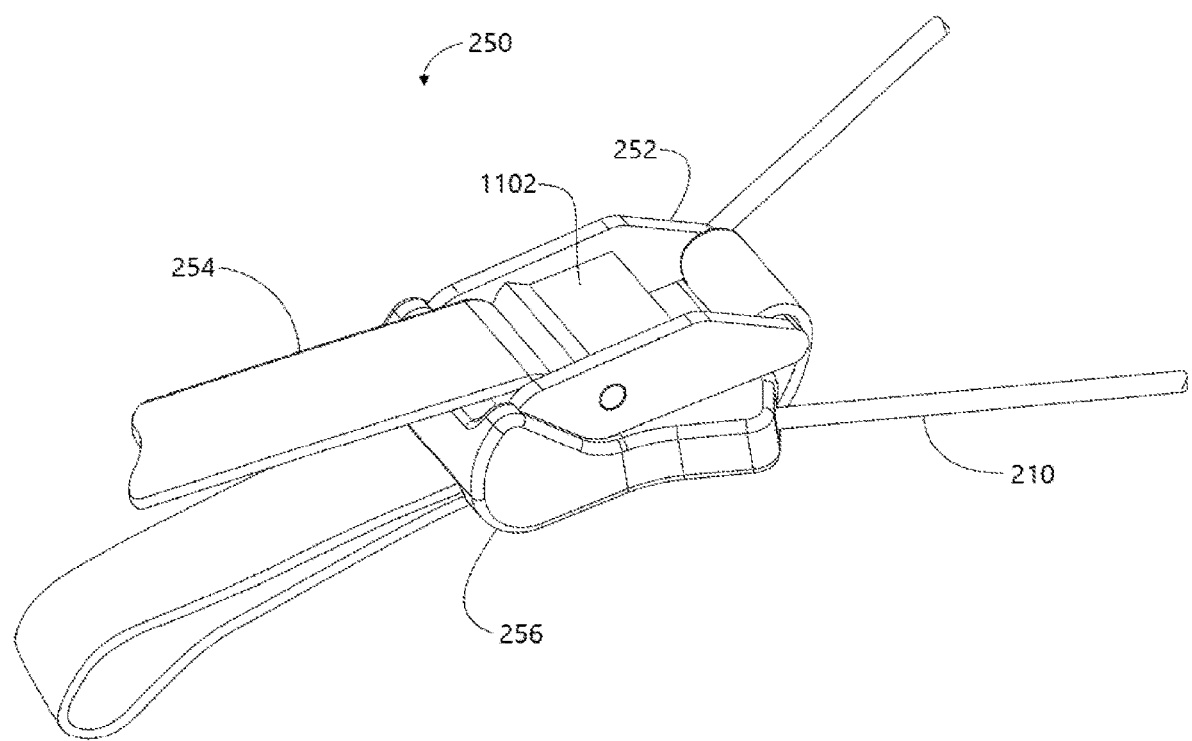
FIG. 15 is a top perspective view of the cam-lock component of FIG. 11.
Figure 16:
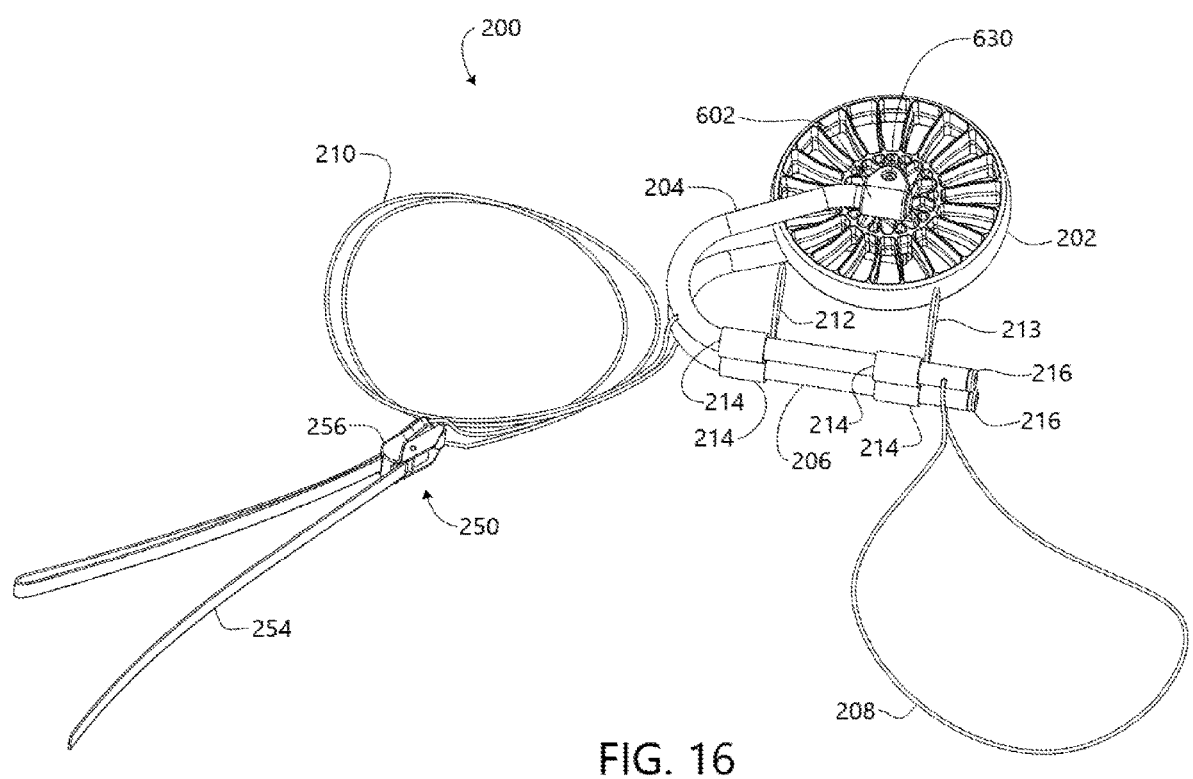
FIG. 16 is a perspective view of the wheel subassembly of FIG. 2 in the closed position.
Figure 17:
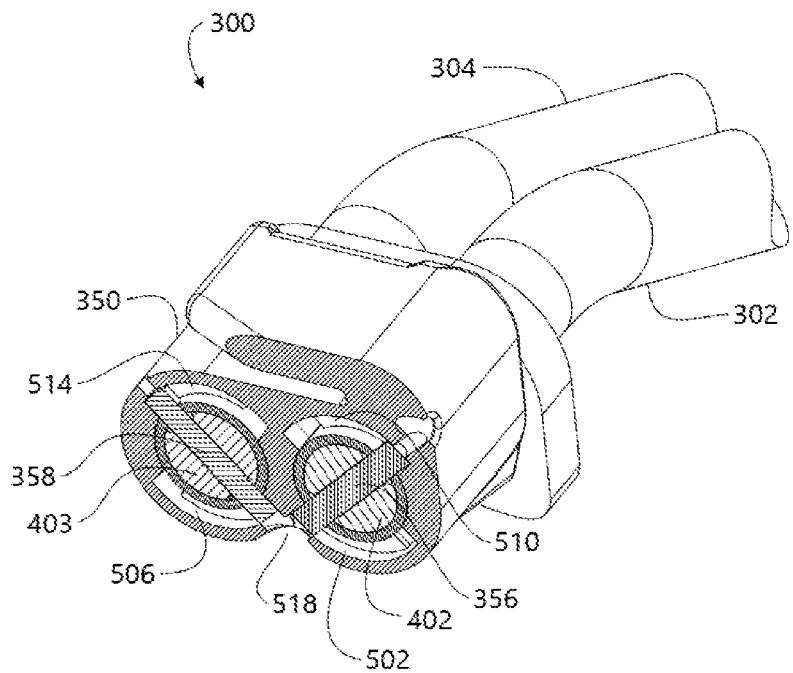
FIG. 17 is a sectional view through handle block of FIG. 4 with handle tubes in the closed position.
Figure 18:
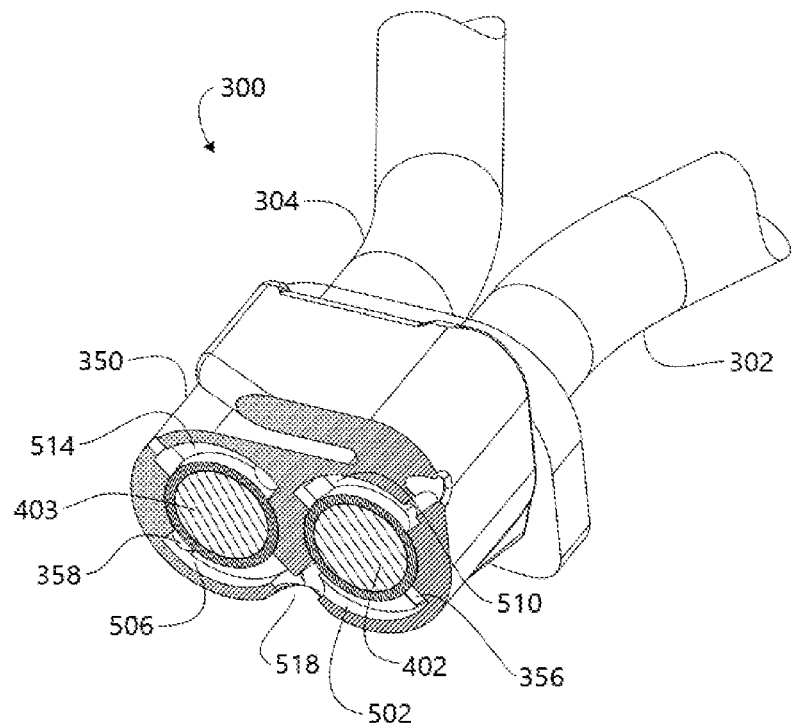
FIG. 18 is a sectional view through the handle block of FIG. 4 with handle tubes in the open position.
Figure 19:
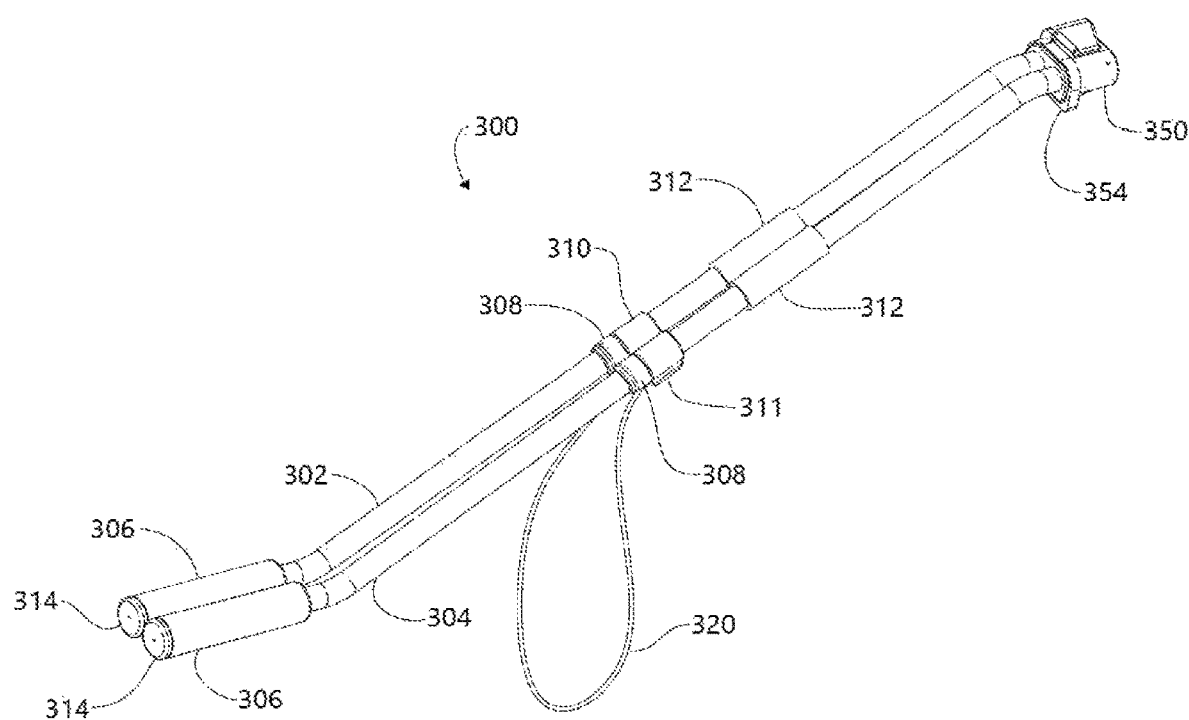
FIG. 19 is a perspective top view of the handle subassembly of FIG. 3 in the closed position.
Figure 20:
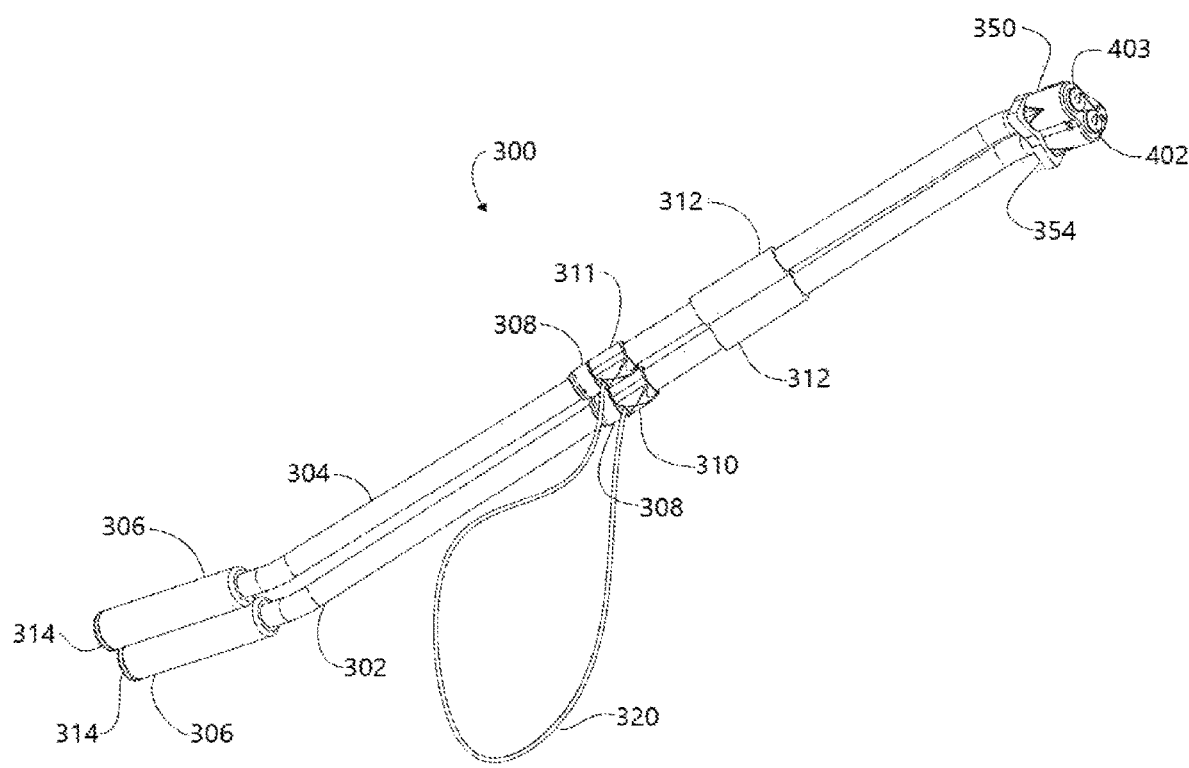
FIG. 20 is a perspective bottom view of the handle subassembly of FIG. 3 in the closed position.
Figure 21:
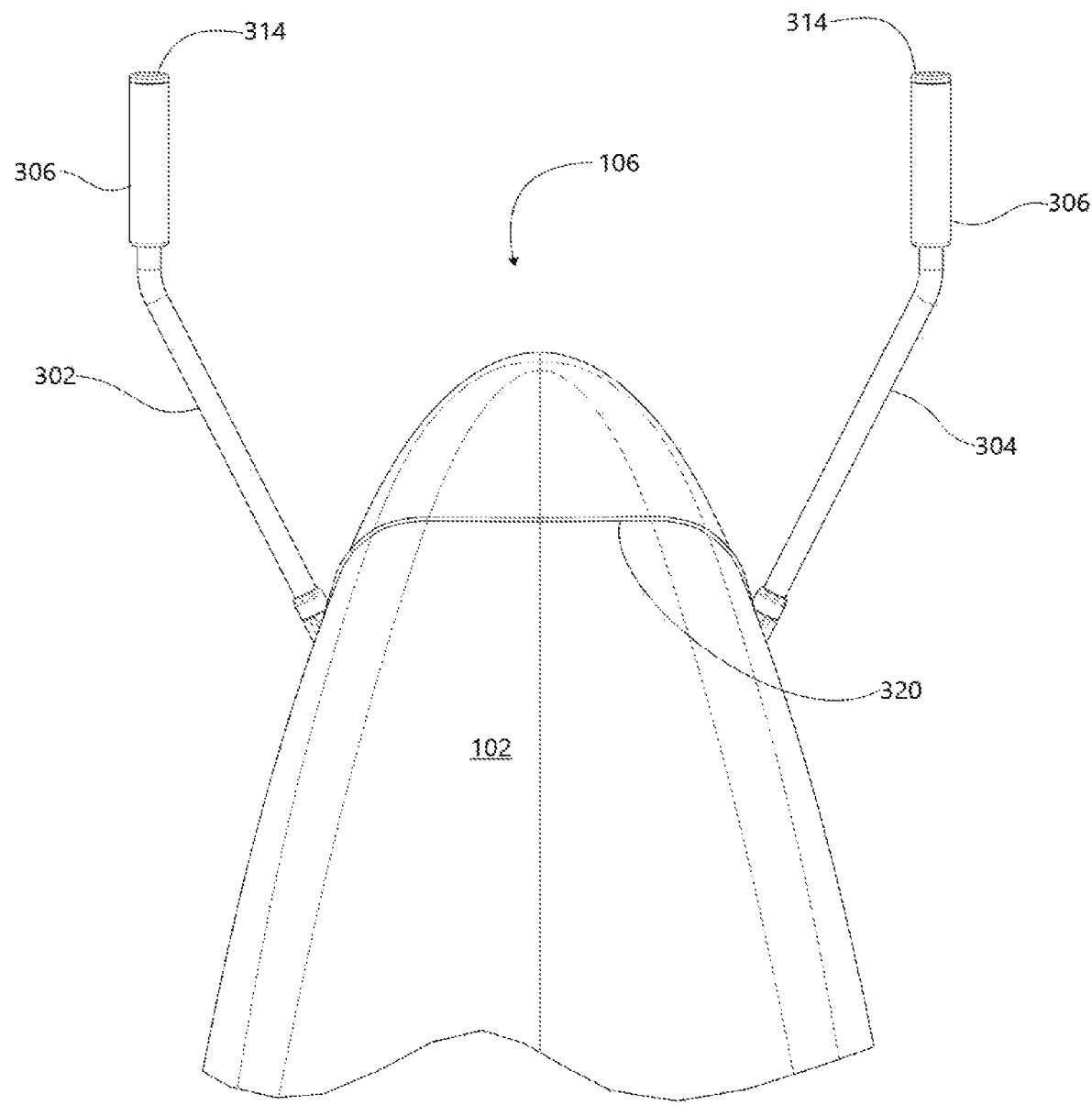
FIG. 21 is a bottom plan view of the handle subassembly of FIG. 3 mounted to a personal watercraft viewed from a bottom side of the personal watercraft.
Figure 22:
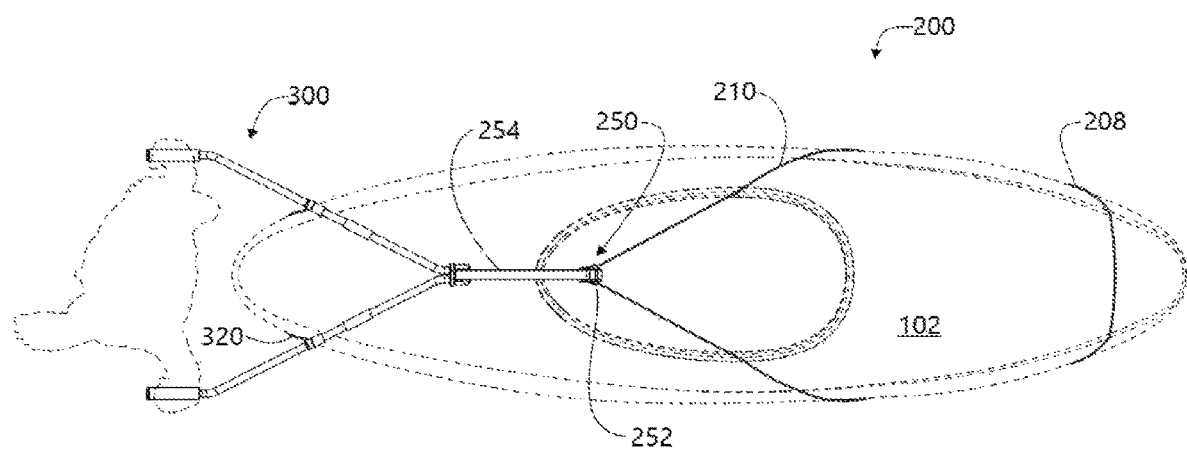
FIG. 22 is a top plan view of the watercraft transport device of FIG. 1 attached to a typical personal watercraft being transported by a user.
Figure 23:
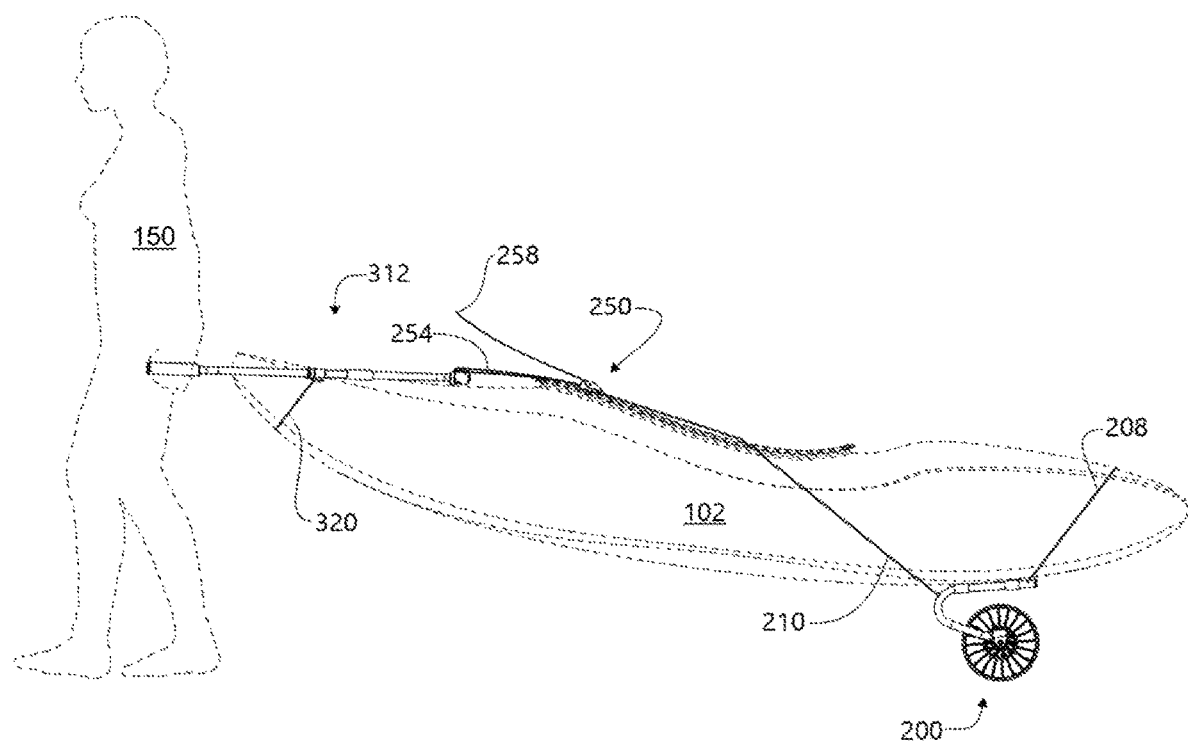
FIG. 23 is an elevation view showing the watercraft transport device of FIG. 1 attached to a personal watercraft being transported by a user.

The strap loop 1306 of the tensioning device 250 is then placed on the strap flange 352 of the handle block 350 as shown in FIGS. 13 and 14. The user 105 then pulls a free end 258 of flexible tension strap 254. As tension is applied to the free end 258 of the flexible tension strap 254, the tension strap 254 travels through a cam-lock device 252/256 and shortens the strap loop 1306. The cam-lock device 252/256 operates to allow an increase in tension on one portion of the flexible tension strap 254, here the strap loop 1306, while allowing a separate portion of flexible tension strap 254 to remain tension-free, here a free end 258. As the strap loop 1306 is shortened, the wheel subassembly 200 and handle subassembly 300 are pulled towards each other in the direction of the middle portion 108 of the watercraft 102. The strap loop 1306 is shortened until wheel subassembly 200 becomes constrained by the first cable loop 208 and the handle subassembly 300 becomes constrained by third cable loop 320 and sufficient tension is applied to the second cable-loop 210 to prevent movement of the handle subassembly 300 and wheel subassembly 200 with respect to the watercraft 102. The watercraft contact cushions 214, 312 and 354 further aid in eliminating unwanted motion of the watercraft 102 under tension. When tension is applied to the flexible tension strap 254, and the handle subassembly 300 is in the open position, the pins 356 and 358 are caused to engage notches 504 and 508 if not previously engaged by the user applying pressure to end caps 402 and 403.

Further, when tension is applied to the flexible tension strap 254, the wheel subassembly 200 and handle subassembly 300 are pulled together toward the middle portion 108 the watercraft 102. The wheel subassembly 200 is ultimately in the desired position when the first cable-loop 208 of fixed length, encircling the first end 104 of the watercraft 102 is limited in further travel toward the middle portion 108 by the increased sectional area of the first end 104 of the watercraft 102. Likewise, the handle subassembly 300 is ultimately in the desired position when the third cable-loop 320 of fixed length, encircling the second end 106 of the watercraft 102, is limited in further travel toward the middle portion 108 by the increased sectional area of the second end 106 of the watercraft 102.

Figure 11:
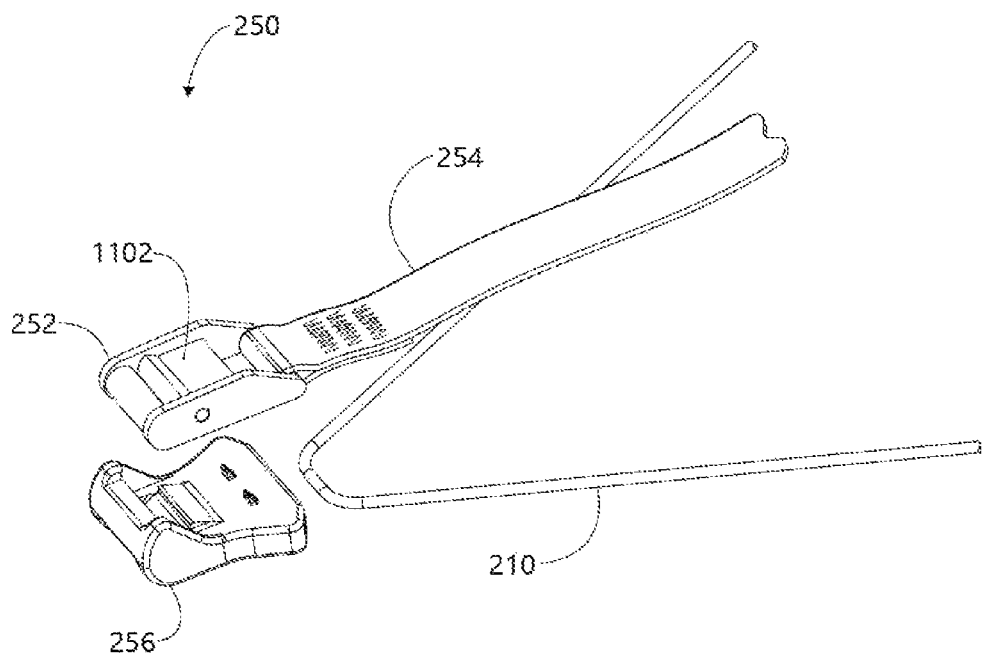
FIG. 11 is a partial exploded view of a cam-lock component of the wheel subassembly of FIG. 2.
Figure 12:
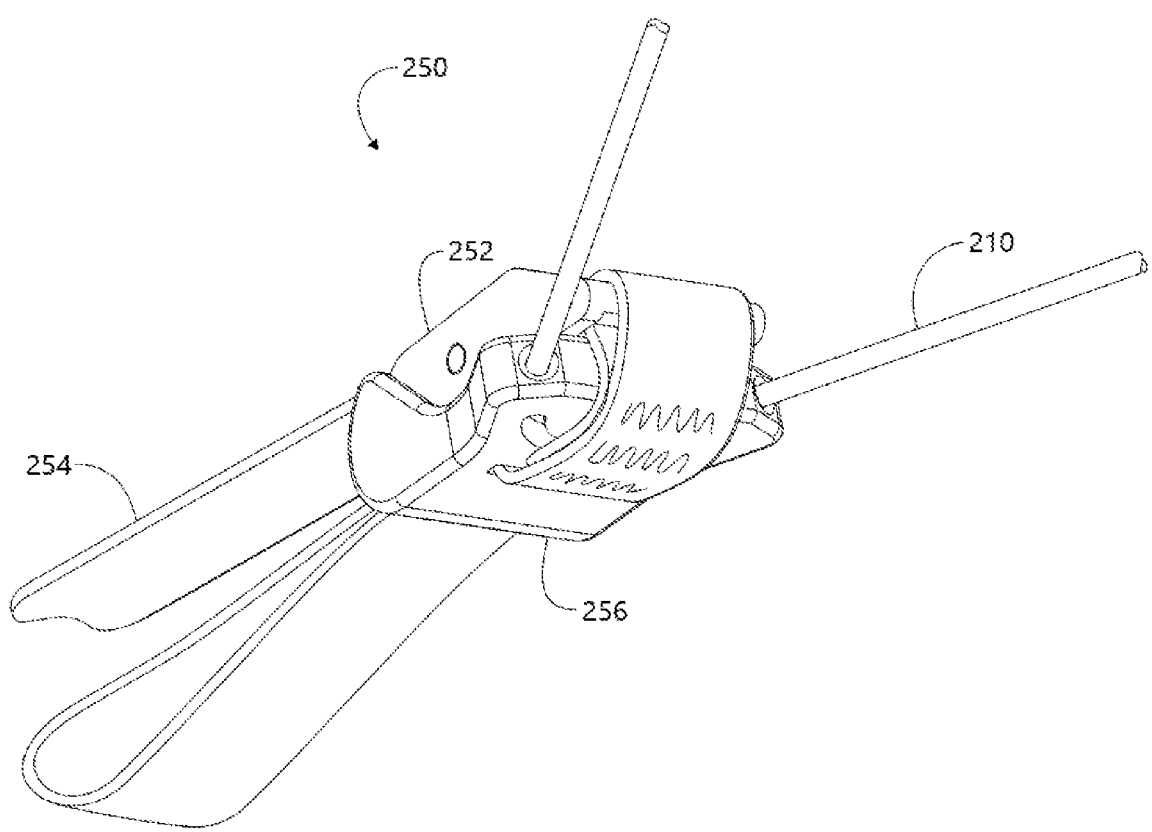
FIG. 12 is a partial bottom perspective view of the cam-lock component of FIG. 11.

FIGS. 11-13 illustrate the aspects of cam-lock device 252/256 of the wheel subassembly 200. An upper portion 252 of the cam-lock device fits onto a cam-cable connector 256 and is held in position by the routing of the flexible tension strap 254 through the cam-cable connector 256 and the upper portion 252 of the cam-lock device. The flexible tension strap 254 is looped over strap anchoring bar 1302 and is affixed to itself at joint 1308 forming a permanent connection where it wraps around the strap anchoring bar 1302 of the upper portion 252. In FIG. 11 the flexible tension strap 254 is illustrated prior to being routed through the cam-cable connector 256.

FIGS. 11 and 13 shows the routing of flexible tension strap 254 and the second cable-loop 210 through the assembly of cam-cable connector 256 and upper portion 252. The flexible tension strap 254 is routed through a cavity in the cam-cable connector 256 to form the strap loop 1306. The fee end 258 is then routed through the cavity of the cam-cable connector 256 and then through the upper portion 252 around a cam-lock strap routing bar 1304 so that the flexible tension strap 254 is adjacent to a cam-lock strap release lever 1102.

With both wheel subassembly 200 and handle subassembly 300 operatively connected to personal watercraft 102, the user 150 may now apply upward force to the grips 306. Applying an upward force upon grips 306 lifts the personal watercraft 102 off the ground, placing the wheel 202 in contact with the ground. The user 150 may now easily transport the personal watercraft 102 more easily to the desired destination.

A feature of the handle subassembly 300 is the method of attachment the third cable-loop 320 to first and second handle tubes 302 and 304. In the preferred embodiment the third cable-loop 320 is attached to a cable-loop retainers 310 and 311. The cable-loop retainers 310 and 311 are allowed free rotation about the first and second handle tubes 302 and 304 to assist with alignment of the direction of pull on the third cable-loop 320 and to prevent kinking and bending of the cable-loop 320 near the point of attachment when attached to watercraft 102 and when the cable-loop 320 is folded for storage. The free rotation also assists allowing conformation of the third cable-loop 320 to differing hull shapes. The cable-loop retainers 310 and 311 may slide off the handle tubes 302 and 304 if not constrained by cable-loop stops 308 and watercraft contact cushions 312 that are permanently attached to handle tubes 302 and 304. In the preferred embodiment cable-loop stops 308 and watercraft contact cushions 312 are bonded to handle tubes 302 and 304 with an adhesive.

Upon arrival at said destination, the user 150 depresses a release lever 1102 of the cam-lock device 252/256 to release the tension from the flexible tension strap 254. The strap loop 1306 may then be removed from the strap flange 352 and the wheel subassembly 200 and handle subassembly 300 are removed from the personal watercraft 102. The wheel subassembly 200 may then be collapsed for stowage by rotating the first U-shaped support tube 204 and second U-shaped support tube 206 towards the centerline of the wheel 202 until first U-shaped support tube 204 and second U-shaped support tube 206 are in contact with one another and no more inward rotation is possible. The first cable loop 208 and the second cable loop 210 may then be coiled to minimize size and prevent tangling. The handle subassembly 300 may also be collapsed for stowage by pushing the handles through the handle block 350 a distance that is sufficient to disengage the pins 356 and 358 from the notches 504 and 508, then rotating the first handle tube 302 and the second handle tube 304 towards centerline of the handle block 350 until the first handle tube 302 and the second handle tube 304 are in contact and no more inward rotation is possible. The transportation kit is then ready for storage.

In certain embodiments, the transportation kit includes a storage bag for holding the wheel subassembly 200.

In certain embodiments, the watercraft contact cushions 214, 312, and 354 are comprised of a foam rubber or an EPDM rubber material with a durometer of around 60 A scale.

In some embodiments, the first U-shaped support tube 204, the second U-shaped support tube 206, the first handle tube 302, and the second handle tube 304 are constructed from aluminum tubing.

In certain embodiments, the first cable-loop 208, the second cable-loop 210, and the third cable-loop 320, are made of stainless-steel wire rope having a nylon, vinyl, or other durable plastic coating.

In certain embodiments, the at least one support device 212 on the wheel subassembly 200 is a stainless-steel wire rope with a durable plastic coating.

In certain embodiments, a second support device 213 is included on the wheel subassembly 200

In certain embodiments, the first cable-loop 208, the second cable-loop 210 and the support device 212 are anchored within the first and second U-Shaped Support tubes 204 and 206 by swaged metal stops larger in diameter than the tubing holes each cable protrudes through. This attachment method allows free rotation of the cable about its own lengthwise axis and the axis of the hole in the tube wall where the cable is restrained.

In certain embodiments, the tensioning device 250 includes a commercially available polypropylene flexible tension strap 254 and the cam-lock device 252/256.

In the preferred embodiment the wheel 202 is comprised of polyether urethane with durometer approximately 90 A scale. The nature of the urethane and the flexible spoke design provides a cushioning and dampening effect improving performance when traversing rough terrain.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

The invention claimed is:

1. A transportation kit for a personal watercraft comprising:
   a foldable single wheel subassembly configured to engage a first end of a bottom portion of the personal watercraft, wherein the foldable wheel assembly further comprises first and second u-shaped support tubes attached to an axle for the foldable single wheel assembly; a first cable-loop attached to the first and second support tubes, wherein the first cable-loop is configured to encircle a portion of the first end of the personal watercraft; a second cable-loop attached to the first and second support tubes, wherein the second cable-loop is configured to encircle a portion of a mid-portion of the personal watercraft; and a tensioning device attached to the second cable-loop; and
   a foldable handle subassembly comprising a third cable-loop configured to encircle a portion of a second end of the personal watercraft; a first handle tube having first and second ends; and a second handle tube having first and second ends, wherein the first end of each of the first and second handle tubes comprises a handle block having a strap flange disposed thereon configured to engage the tensioning device for tensioning the first cable-loop, second cable-loop and third cable-loop with respect to the personal watercraft to removably attach the transportation kit to the personal watercraft.

2. The transportation kit of claim 1, wherein the personal watercraft is a commercially available kayak.

3. The transportation kit of claim 1, wherein the first u-shaped support tube, the second u-shaped support tube, the first handle tube, and the second handle tube are comprised of aluminum tubing.

4. The transportation kit of claim 1, wherein the first cable-loop, the second cable-loop and the third cable-loop are stainless-steel wire rope coated with a durable plastic coating.

5. The transportation kit of claim 1, wherein the tensioning device is a commercially available polypropylene webbing strap and cam-lock.

6. The transportation kit of claim 1, wherein the handle block comprising a motion limiting device for the first and second handle tubes.

7. The transportation kit of claim 6, wherein the handle block comprises:
   a first groove disposed tangentially upon an outer edge of a first hole of the handle block wherein the first groove has a first end, a second end, and a first notch disposed perpendicular to the second end;
   a second groove disposed tangentially upon an outer edge of a second hole of the handle block wherein the second groove has a first end, a second end, and a second notch disposed perpendicular to the second end;
   a first pin disposed in the first groove and in a hole disposed in the first end of the first handle tube;
   a second pin disposed in the second groove and in a hole disposed in the first end of the second handle tube;
   wherein the first pin is located within the hole disposed in the first handle tube and engages the first groove as the first handle tube is inserted into the first hole of the handle block;
   wherein the second pin is located within the hole disposed in the second handle tube and engages the second groove as the second handle tube is inserted into the second hole of the handle block;
   wherein as the first handle tube is rotated axially about the first hole of the handle block, the first pin travels within the first groove;
   wherein as the second handle tube is rotated axially about the second hole of the handle block, the second pin travels withing the second groove;
   wherein as the first handle tube reaches maximum outward rotation, the first pin engages a first notch;
   wherein as the second handle tube reaches maximum outward rotation, the second pin engages a second notch; and
   wherein as tension is applied to the handle block via the tensioning device, the first and second pins are constrained within the first and second notches.

8. A method of attaching a transportation kit to a personal watercraft comprising:
   providing a collapsible wheel subassembly comprising:
      a single wheel rotationally attached to an axle;
      a first u-shaped support tube;
      a second u-shaped support tube;
      at least one support device disposed between the first u-shaped support tube and the second u-shaped support tube constraining an outward radial rotation of the first u-shaped support tube and the second u-shaped support tube;
      a first cable-loop sized to encircle a first end of a personal watercraft attached adjacent to the second end of the first and second u-shaped support tubes;

a second cable-loop sized to encircle a middle portion of the personal watercraft attached to the first and second u-shaped tubes between the first end and the second end of each of the first and second u-shaped tubes; and a tensioning device attached to the second cable-loop;

providing a collapsible handle subassembly comprising:

a first handle tube;

a second handle tube;

a third cable-loop sized to encircle a second end of a personal watercraft; and a handle block having a strap flange disposed to an exterior portion of the handle block, the handle block having a first hole and a second hole sized to receive the first handle tube and the second handle tube, and a motion limiting device for each of the first and second handle tubes;

arranging the wheel sub assembly in relation to the personal watercraft so as to locate the middle portion of the personal watercraft within the second cable loop of the wheel assembly, the first end of the personal watercraft within the first cable loop of the wheel sub assembly, with the lower portion of the personal watercraft resting on each of the first and second u-shaped support tubes of the wheel sub assembly;

arranging the handle subassembly in relation to the personal watercraft so as to locate the second end of the personal watercraft within the third cable-loop, while positioning the handle block on a top surface of the personal watercraft, rotating the first handle tube and the second handle tube axially to orient the first handle tube and the second handle tube at the maximum distance allowed by the motion limiting device; and connecting the wheel subassembly to the strap flange to provide tension on the first cable-loop, second cable-loop, and third cable-loop; and tensioning the tensioning device, so that the first cable loop, the second cable loop, and the third cable loop are brought into firm contact with the personal watercraft and assembly, allowing the personal watercraft to be transported via the wheel and controlled via the first handle tube and the second handle tube.

9. The method of claim 8, wherein the personal watercraft is a commercially available kayak.

10. The method of claim 8, wherein the first u-shaped support tube, the second u-shaped support tube, the first handle tube, and the second handle tube are comprised of aluminum tubing.

11. The method of claim 8, wherein the first cable-loop, the second cable-loop and the third cable-loop are stainless-steel wire rope coated with a durable plastic coating.

12. The method of claim 8, wherein the tensioning device is a commercially available polypropylene webbing strap and cam-lock.

13. The method of claim 8, wherein the motion limiting device comprises:

a first groove disposed tangentially upon an outer edge of the first hole of the handle block wherein the first groove has a first end, a second end, and a first notch disposed perpendicular to the second end;

a second groove disposed tangentially upon an outer edge of the second hole of the handle block wherein the second groove has a first end, a second end, and a second notch disposed perpendicular to the second end;

a first pin disposed in the first groove and in a hole disposed in the first end of the first handle tube;

a second pin disposed in the second grove and in a hole disposed in the first end of the second handle tube;

wherein the first pin is located within the hole disposed in the first handle tube and engages the first groove as the first handle tube is inserted into the first hole of the handle block;

wherein the second pin is located within the hole disposed in the second handle tube and engages the second groove as the second handle tube is inserted into the second hole of the handle block;

further comprising:

rotating the first handle tube axially about the first hole of the handle block so that the first pin travels within the first groove;

rotating the second handle tube is rotated axially about the second hole of the handle block, the second pin travels withing the second groove;

wherein as the first handle tube reaches maximum outward rotation, the first pin engages a first notch;

wherein as the second handle tube reaches maximum outward rotation, the second pin engages a second notch; and tensioning the handle block via the tensioning device to constrain the first and second pins within the first and second notches.

14. A transportation kit for a personal watercraft comprising:

a) a wheel subassembly comprising:

a single wheel, the wheel rotationally attached to an axle;

a first wheel support, the first wheel support having a first hole for receiving a first end of the axle and a second hole disposed for receiving a first end of a first u-shaped support tube;

a second wheel support, the second wheel support having a first hole for receiving a second end of the axle and a second hole disposed for receiving a first end of a second u-shaped support tube;

at least one support device disposed between the first u-shaped support tube and the second u-shaped support tube, thereby constraining an outward radial rotation of the first u-shaped support tube and the second u-shaped support tube;

a first cable-loop sized to encircle a first end of a personal watercraft attached adjacent to the second ends of first and second u-shaped support tubes;

a second cable-loop sized to encircle a middle portion of the personal watercraft attached to the first and second u-shaped tubes between the first end and the second end of each of the first and second u-shaped tubes; and a tensioning device attached to the second cable-loop;

wherein a portion of each of the first and second u-shaped support tubes rests against a bottom surface of the personal watercraft; and b) a handle subassembly comprising:

a first handle tube, the first handle tube having a first end and a second end;

a second handle tube, the second handle tube having a first end and a second end;

a third cable-loop sized to encircle a second end of a personal watercraft attached to the first handle tube and to the second handle tube; and a handle block having a strap flange disposed on an exterior portion of the handle block, the handle block having a first hole and a second hole sized to receive the first end of the first handle tube and the first end of the second handle tube, and a motion limiting device for each of the first and second handle tubes.

15. The transportation kit of claim 14, wherein the personal watercraft is a commercially available kayak.

16. The transportation kit of claim 14, wherein the first u-shaped support tube, the second u-shaped support tube, the first handle tube, and the second handle tube are comprised of aluminum tubing.

17. The transportation kit of claim 14, wherein the first cable-loop, the second cable-loop and the third cable-loop are stainless-steel wire rope coated with a durable plastic coating.

18. The transportation kit of claim 14, wherein the at least one support device of the wheel subassembly is stainless-steel wire rope coated with a durable plastic coating.

19. The transportation kit of claim 14, wherein the tensioning device is a commercially available polypropylene webbing strap and cam-lock.

20. The transportation kit of claim 14, wherein the motion limiting device of the handle block is a subassembly comprised of:
- a first groove disposed tangentially upon an outer edge of a first hole of the handle block wherein the first groove has a first end, a second end, and a first notch disposed perpendicular to the second end;
- a second groove disposed tangentially upon an outer edge of a second hole of the handle block wherein the second groove has a first end, a second end, and a second notch disposed perpendicular to the second end;
- a first pin disposed in the first groove and in a hole disposed in the first end of the first handle tube;
- a second pin disposed in the second grove and in a hole disposed in the first end of the second handle tube;
- wherein the first pin is located within the hole disposed in the first handle tube and engages the first groove as the first handle tube is inserted into the first hole of the handle block;
- wherein the second pin is located within the hole disposed in the second handle tube and engages the second groove as the second handle tube is inserted into the second hole of the handle block;
- wherein as the first handle tube is rotated axially about the first hole of the handle block, the first pin travels within the first groove;
- wherein as the second handle tube is rotated axially about the second hole of the handle block, the second pin travels withing the second groove;
- wherein as the first handle tube reaches maximum outward rotation, the first pin engages a first notch;
- wherein as the second handle tube reaches maximum outward rotation, the second pin engages a second notch; and
- wherein as tension is applied to the handle block via the tensioning device, the first and second pins are constrained within the first and second notches.

\* \* \* \* \*